US005846178A

United States Patent [19]

Forrester

[11] Patent Number: 5,846,178

[45] Date of Patent: Dec. 8, 1998

[54] STABILIZATION OF LEAD BEARING WASTE

[76] Inventor: Keith E. Forrester, 883 Ocean Blvd., Hampton, N.H. 03843-2008

[21] Appl. No.: 33,386

[22] Filed: Mar. 2, 1998

Related U.S. Application Data

[63] Continuation of Ser. No. 683,606, Jul. 15, 1996, Pat. No. 5,722,928, which is a continuation-in-part of Ser. No. 318, 538, Oct. 5, 1994, Pat. No. 5,536,899, which is a continuation-in-part of Ser. No. 38,812, Mar. 29, 1993, abandoned.

[51] Int. Cl.[6] .......... A62D 3/00; B09B 3/00

[52] U.S. Cl. .......... 588/256; 588/260; 588/901

[58] Field of Search .......... 405/128, 129; 588/236, 256, 260, 901; 210/912

[56] References Cited

U.S. PATENT DOCUMENTS

| | | | |
|---|---|---|---|
| 4,049,462 | 9/1977 | Cocozza . | |
| 4,113,504 | 9/1978 | Chen et al. . | |
| 4,124,405 | 11/1978 | Quiénot . | |
| 4,375,986 | 3/1983 | Pichat . | |
| 4,536,034 | 8/1985 | Otto, Jr. et al. | 299/5 |
| 4,610,722 | 9/1986 | Duyvesteyn et al. | 75/97 |
| 4,629,509 | 12/1986 | O'Hara et al. . | |
| 4,671,882 | 6/1987 | Douglas et al. | 210/720 |
| 4,737,356 | 4/1988 | O'Hara et al. | 423/659 |
| 4,804,147 | 2/1989 | Hooper | 241/24 |
| 4,889,640 | 12/1989 | Stanforth . | |
| 4,948,516 | 8/1990 | Fisher et al. . | |
| 4,950,409 | 8/1990 | Stanforth . | |
| 4,975,115 | 12/1990 | Irons | 75/330 |
| 5,130,051 | 7/1992 | Falk | 252/315.5 |
| 5,162,600 | 11/1992 | Cody et al. | 588/236 |
| 5,193,936 | 3/1993 | Pal et al. | 405/128 |
| 5,202,033 | 4/1993 | Stanforth et al. | 210/747 |
| 5,245,114 | 9/1993 | Forrester | 588/236 |
| 5,284,636 | 2/1994 | Goff et al. | 423/235 |
| 5,430,233 | 7/1995 | Forrester | 588/236 |
| 5,431,825 | 7/1995 | Diel | 210/719 |
| 5,536,899 | 7/1996 | Forrester | 588/256 |
| 5,545,805 | 8/1996 | Chesner | 588/256 |
| 5,569,155 | 10/1996 | Pal et al. | 588/256 |
| 5,667,696 | 9/1997 | Studer et al. | 210/912 X |
| 5,722,928 | 3/1998 | Forrester | 588/256 |

*Primary Examiner*—George Suchfield
*Attorney, Agent, or Firm*—Hamilton, Brook, Smith & Reynolds, P.C.

[57] ABSTRACT

A method is disclosed for reducing the leaching of lead from a lead bearing material or waste. The method includes contacting the material or waste with a water soluble phosphate and a complexing agent, wherein the complexing agent is at least slightly water soluble, whereby a lead product is formed which is less soluble than the lead originally in the material or waste, thereby reducing the leaching of lead from the material or waste as determined by a leach test performed on the material or waste.

24 Claims, No Drawings

STABILIZATION OF LEAD BEARING WASTE

RELATED APPLICATIONS

This is a continuation of U.S. Ser. No. 08/683,606, filed Jul. 15, 1996, (U.S. Pat. No. 5,722,928) which is a continuation-in-part application of U.S. Ser. No. 08/318, 538, filed Oct. 5, 1994 (U.S. Pat. No. 5,536,899), which is a continuation-in-part of U.S. Ser. No. 08/038,812, filed Mar. 29, 1993 (abandoned), the entire teachings of which are incorporated herein by reference.

BACKGROUND OF THE INVENTION

The leaching of heavy metals from heavy metal bearing wastes has long been of concern to environmental regulators and waste producers. Under the Resource Conservation and Recovery Act, solid waste is classified by the U.S. Environmental Protection Agency (EPA) as hazardous waste if excessive amounts of heavy metals leach from the waste when tested according to the Toxicity Characteristic Leaching Procedure (TCLP). In addition, several state governments require that heavy metal bearing wastes, having higher leaching levels, be directed to hazardous waste landfills. Disposal of waste at hazardous waste landfills is typically more expensive than disposal at non-hazardous waste facilities.

To reduce the expenses associated with the landfill disposal of heavy metal leachable waste, particularly lead bearing wastes, various methods to control heavy metal leaching have been developed. These methods include the treatment of lead bearing waste with, for example, phosphates, sulfides, calcium salts, metal oxides, vermiculite, aluminosilicates or portland cement. However, due to the mixing equipment and/or chemicals required, these methods are often expensive to perform. Additionally, some of these methods use chemicals, such as ferric chloride which, in the amounts used, are very corrosive to waste generation and/or treatment process equipment. Furthermore, some methods for reducing lead leaching can result in the formation of potential carcinogens, such as lead phosphate.

Thus, a need exists for means of reducing lead leaching, from lead bearing material or waste, which are less expensive and less damaging to equipment, and which do not form carcinogenic products.

SUMMARY OF THE INVENTION

The present invention relates to a method for reducing the leaching of lead from a lead bearing material or waste. The method includes contacting the material or waste with a water soluble phosphate and a complexing agent, wherein the complexing agent is at least slightly water soluble, whereby a lead product is formed which is less soluble than the lead originally in the material or waste, thereby reducing the leaching of lead from the material or waste as determined by a leach test performed on the material or waste. Preferably the material or waste is contacted with composition comprising a water soluble phosphate, dissolved aluminum and sulfuric acid and/or nitric acid, which composition is a co-product from the chemical polishing of aluminum.

This invention has the advantages of reducing the leachability of lead from lead bearing material or waste, under leach test conditions, at a lower price and with lesser amounts of phosphate and completing agent. This invention has the additional advantage of reducing the corrosion, resulting from waste stabilization, of waste production and processing equipment.

DETAILED DESCRIPTION OF THE INVENTION

Material or waste stabilization is herein defined as reducing the leaching of lead from a lead bearing material or waste, as determined by performing a suitable leach test on the material or waste. It should be recognized that the lead bearing material need not be a waste but can be any material containing lead in which it is desirable to stabilize the lead therein. The material can ultimately become waste. Wastes suitable for stabilization, according to the method of invention, typically include solids in waste streams (i.e., a material in liquid or dry form from industrial processing that is commonly subjected to waste disposal), waste piles and material that will be further processed from one waste form to another. In a waste stream, the solid waste can optionally be entrained in a liquid or a gas. Examples of lead bearing materials and wastes which can be stabilized include material and wastes from auto shredders' fluff, wire chop, electroplating processes, arc dust collectors, cupola metal furnaces, sand blasting, sewage sludge drying beds, lead contaminated soil, sweat furnace and incinerator ash. Additional examples of wastes suitable for stabilization include residues and products of the combustion, or partial combustion, of medical waste, commercial waste, industrial waste, sewage sludge and solid municipal waste. This method can also be used to stabilize foundry sand.

The lead, in the lead bearing material or waste to be stabilized, can be in elemental form and/or cationic form. Lead bearing waste can contain up to about 100 ppm, or more, of leachable lead. However, leachable lead levels, in the material to be stabilized, are more typically between about 5 ppm to about 20 ppm.

Leach test conditions, as defined herein, include the conditions to which a material or waste is subjected during acetic acid leaching, citric acid leaching, other chelating leaching methods or extraction leaching. Suitable acetic acid leach tests include the Toxicity Characteristic Leaching Procedure (TCLP), which is described by the EPA in the *USEPA SW-84 Manual.* Briefly, in a TCLP test, 100 grams of waste are stirred with 2 liters of dilute acetic acid for a period of 18 hours. The dilution of the acetic acid is 5.7 mLs of concentrated acetic acid per liter of water. Leachable lead, contained in the material or waste, then complexes with acetate anions to form lead acetate. A TCLP result of ≧5 ppm lead will result in the classification of the waste as hazardous waste.

Suitable citric acid leach tests include the California Waste Extraction Test (WET), which is described in Title 22, Section 66700, "Environmental Health" of the *California Health and Safety Code.* Briefly, in a WET test, 50 grams of waste are tumbled in a 1000 mL tumbler with 500 grams of sodium citrate solution for a period of 48 hours. Leachable lead, contained in the waste, then complexes with citrate anions to form lead citrate. The concentration of leached lead is then analyzed by Inductively-Coupled Plasma (ICP) after filtration of a 100 mL aliquot from the tumbler through a 45 micron glass bead filter. A WET result of ≧5 ppm lead will result in the classification of the waste as hazardous waste.

In one method for stabilizing lead bearing materials or wastes, a suitable material or waste is contacted, under alkaline or neutral pH conditions, with a water soluble phosphate and a complexing agent. The complexing agent is typically at least slightly water soluble. When contacted with a phosphate and a complexing agent, lead in the material or waste forms a lead product, typically a mineral, or complex, which is less soluble than the lead originally in the material or waste, particularly under leach test conditions. For example, the minerals plumbogummite and chloropyromorphite are formed by contacting lead with $Al_2O_3$ or $Al_2O_3$ and chloride ions.

Examples of suitable water soluble phosphates include, but are not limited to phosphoric acids, salts of phosphoric acids, $P_2O_5$, combinations thereof and compositions containing one or more non-phosphate components in addition to phosphoric acid(s), phosphoric acid salt(s) and/or $P_2O_5$. Examples of such suitable compositions, containing one or more non-phosphate components, include "TRIPLE SUPER PHOSPHATE ($P_2O_5$)" fertilizer, which contains $P_2O_5$, and phosphoric acid co-product solution resulting from the chemical polishing or finishing of aluminum, which includes phosphoric acid and typically nitric acid and/or sulfuric acid. Suitable phosphoric acids include orthophosphoric acid, hypophosphoric acid, metaphosphoric acid and pyrophosphoric acid. Salts of phosphoric acids include, for instance, monoammonium phosphate, diammonium phosphate, disodium hydrogen phosphate, trisodium phosphate and combinations thereof.

In one embodiment, suitable complexing agents contain a multivalent metal cation component. The multivalent cation component is typically at least slightly water soluble. Suitable multivalent metal cation components contain, for instance, iron (II), iron (III), aluminum (III) or combinations thereof. Examples of suitable multivalent metal cation components include $Fe(NO_3)_3$, $FeSO_4$, $Fe_2(SO_4)_3$, $FeCl_3$, $Al_2(SO_4)_3$, $Al_2O_3$, aluminosilicate and combinations thereof.

In an alternate embodiment, suitable complexing agents contain a chloride component which is contained in an aqueous solution or is in the form of a solid water soluble salt. An example of a suitable chloride component is table salt or sodium chloride.

A solution of phosphoric acid, dissolved aluminum and optionally sulfuric acid and/or nitric acid can be premixed together prior to use. A preferred formulation will contain from about 35 to about 37% phosphoric acid, from about 1 to 2% dissolved aluminum and optionally from about 5 to about 8% sulfuric acid and/or from about 0.5 to about 0.7% nitric acid. The ratio and presence of sulfuric acid and/or nitric acid will depend upon the nature of the process employed for polishing or finishing of aluminum. Such formulations are available as waste phosphate resulting from the chemical polishing or finishing of aluminum. These waste phosphate formulations are also know in the industry as co-product or rinse water from the polishing or finishing of aluminum. These waste solutions comprise all the necessary components (i.e., phosphate and complexing agent) for lead stabilization. Their use on a lead bearing material or waste provides a one step method for in-line or in-situ lead stabilization.

The amounts of water soluble phosphate and complexing agent used, according to the method of invention, depend upon various factors, such as the type of material or waste being stabilized, chemical makeup of the material or waste, porosity, cohesiveness, the amount of waste, the concentration of lead within the waste, whether the waste is in a waste stream or a waste pile, and waste treatment objectives, such as the desired final concentration of leachable lead. The amounts of phosphate and complexing agent needed to treat a specific material or waste can be readily determined by one of ordinary skill in the art through performing one or more leaching tests, such as TCLP or WET, on a sample of the material or waste.

Typically, the minimum concentrations of phosphate and complexing agent in a treated lead bearing material or waste, which are needed to stabilize said material or waste, are about 0.1 wt. % phosphate and about 0.01 wt. % complexing agent.

The stabilization of lead bearing materials or wastes, with various phosphates and complexing agents, is further described in the Example.

It is understood that the phosphate and the complexing agent can be added to the material or waste either separately, concurrently, in combination, sequentially, intermittently, or in any other sequence or order. It is also understood that the phosphate and/or complexing agent can be added to the material or waste as solids, in aqueous solution or in a slurry. Furthermore, the phosphate and complexing agent can be contacted with the material or waste without mixing, or optionally, with mixing.

In this method, the phosphate and complexing agent can be applied during waste generation, applied to waste contained in a waste stream and/or applied to waste stored in a waste pile. In one embodiment, a phosphate and complexing agent are added to the source of a lead bearing waste prior to generating said lead bearing waste. For example, phosphate and complexing agent can be sprayed, coated, added, mixed or otherwise contacted with copper wire insulation before chopping the copper wire, thereby producing a stabilized lead bearing waste.

In another embodiment, phosphate and complexing agent are coated onto equipment which produces the material or waste. For example, phosphate and complexing agent can be sprayed, coated or otherwise contacted with wire chopping equipment, prior to, or during operation. This enables one to stabilize lead in-situ or in-line.

In yet another embodiment, phosphate and complexing agent are contacted with waste contained in a waste stream, typically without restricting the free flow of the waste stream. For example, phosphate and complexing agent can be directed onto or into waste in a free flowing waste stream by injection, spraying, coating or other suitable means. Alternatively, phosphate and complexing agent can be coated onto equipment which directs and/or transports waste in a waste stream. For example, phosphate and complexing agent can be sprayed, coated or otherwise contacted with equipment for conveying wire chop waste, such as a screw conveyor, prior to or during equipment operation. Further, for incinerator units, a phosphate and complexing agent can be sprayed, coated or otherwise contacted with gas/solid separators, for separating solids from combustion gases, such as cyclone separators or vortex separators, thereby treating the solid waste while separating the solid waste from the gaseous waste product.

In a further embodiment, phosphate and complexing agent can be contacted with waste contained in a waste pile. Typically, the phosphate and complexing agent are added to the surface of the waste pile. Optionally, the phosphate and the complexing agent are directed into the waste pile. Suitable means for directing the phosphate and complexing agent into the waste pile include, for instance, tilling and/or irrigation with surface or subsurface water sprays or water injection. If mixing through tilling, the phosphate and complexing agent are usually mixed into the waste pile to a depth of about one to three feet.

The invention will now be further and more specifically described by the following example.

EXAMPLE

Reduction of Lead Leaching from Wastes

Lead bearing wastes were treated with various amounts of several phosphates and/or complexing agents to evaluate the effect of treatment upon the lead leachability of the wastes. The wastes treated included copper wire insulation (CWI) from wire chop processes, bottom ash (BA) from a refuse-to-energy facility, flyash scrubber residue (FASR), collected from air pollution control devices as a mixture of air entrained flyash and residual scrubbing products from CaO injection, and lead contaminated soil (Pb soil).

The phosphates used included technical grade phosphoric acid (75 wt % $H_3PO_4$ and 25 wt % $H_2O$, hereinafter "$H_3PO_4$"), the dry fertilizer "TRIPLE SUPER PHOSPHATE (TSP)", containing 18 wt. % nitrogen and 46 wt. % $P_2O_5$, purchased from Solutions, Inc. (Franklin, Mass.) and phosphoric acid co-product solution (COP), resulting from chemical polishing of aluminum and consisting essentially of 35–37 wt. % $H_3PO_4$, 25–27 wt. % $P_2O_5$, 5–8 wt. % $H_2SO_4$, 1–wt. % dissolved aluminum and 0.5–0.7 wt. % $HNO_3$. COP was also purchased from Solutions, Inc. (Franklin, Mass.).

The complexing agents used consisted of an aqueous solution $Fe(NO_3)_3$ containing 10.25 wt. % Fe(III), aqueous $Fe_2(SO_4)_3$ solution containing approximately 10 wt. % Fe(III), 30 wt. % $FeCl_3$ aqueous solution, "MORTON'S TABLE SALT (NaCl)" containing 1 wt. % NaCl and silicoalumina, "LIQUID ALUMINUM SULFATE", an aluminum sulfate aqueous solution purchased from Holland Company Inc. (Adams, Mass.), $Al_2O_3$ and milled bauxite, containing 74.2 wt. % $Al_2O_3$ and 7.6 wt. % $Fe_2O_3$.

Following mixing with the phosphate and/or complexing agent, each waste sample, and each waste sample control, was tested for lead leachability utilizing the EPA's acetate TCLP test. The leach tests results obtained are shown in the following table:

| Waste | Post-Treatment Waste Composition (by weight percent) | Pb Leach (ppm) |
|---|---|---|
| CWI | Untreated CWI (CWI control) | 24.30 |
| CWI | 99% CWI and 1.0% $H_3PO_4$ | 19.09 |
| CWI | 97% CWI and 3.0% $H_3PO_4$ | 0.12 |
| CWI | 95% CWI and 5% TSP | 0.17 |
| CWI | 99% CWI and 1.0% $Fe_2(SO_4)_3$ | 3.70 |
| CWI | 99% CWI, 0.5% $H_3PO_4$ & 0.5% $FeCl_3$ | <0.05 |
| CWI | 98.5% CWI, 1.0% $H_3PO_4$ & 0.5% $FeCl_3$ | <0.05 |
| CWI | 97.75% CWI, 2.0% $H_3PO_4$ & 0.25% $Fe(NO_3)_3$ | <0.05 |
| CWI | 97.25% CWI, 2.5% $H_3PO_4$ & 0.25% $Fe(NO_3)_3$ | 0.06 |
| CWI | 98% CWI, 1.0% $H_3PO_4$ & 1.0% NaCl | 2.30 |
| CWI | 98.5% CWI, 1.0% $H_3PO_4$ & 0.5% $Al_2O_3$ | <0.05 |
| CWI | 98% CWI, 1.0% $H_3PO_4$ & 1.0% Bauxite | <0.05 |
| CWI | 98% CWI and 2.0% COP | 0.20 |
| CWI | 98% CWI, 1.5% COP and 0.5% $FeCl_3$ | <0.05 |
| CWI | 98% CWI, 0.5% COP, 0.5% $Fe_2(SO_4)_3$ and 1.0% $H_2O$ | 0.07 |
| CWI | 97% CWI, 0.99% $H_3PO_4$, 0.03% $FeCl_3$, 0.03 $Al_2(SO_4)_3$ and 19.5 $H_2O$ | <0.05 |
| CWI | 99% CWI, 0.33% $H_3PO_4$, 0.01% $FeCl_3$, 0.01 $Al_2(SO_4)$hd 3 and 6.5 $H_2O$ | <5.00 |
| BA | Untreated BA (BA Control) | 6.30 |
| BA | 99.3% BA, 0.2% $H_3PO_4$ & 0.5% $FeCl_3$ | <0.05 |
| FASR | Untreated FASR (FASR Control) | 36.80 |
| FASR | 99% FASR, 0.5% $H_3PO_4$ & 0.5% $FeCl_3$ | 1.90 |
| BA/FASR | 99% BA/FASR, 0.5% $H_3PO_4$ & 0.5% $FeCl_3$ | <0.05 |
| Pb Soil | | 87.00 |
| Pb Soil | 97% Pb Soil and 3.0% COP | 1.7 |

The leach test results demonstrated that treatments of lead bearing wastes, with a combination of a phosphate and a complexing agent generally resulted in lower lead leaching level than did treatment of waste with only a phosphate or with a complexing agent.

EQUIVALENTS

Those skilled in the art will recognize, or be able to ascertain using no more than routine experimentation, many equivalents to specific embodiments of the invention described specifically herein. Such equivalents are intended to be encompassed in the scope of the following claims.

The invention claimed is:

1. A method for reducing the leaching of lead from a lead bearing material or waste, comprising contacting said material or waste with a water soluble phosphate and acid selected from the group consisting of sulfuric acid, nitric acid and combinations thereof, in the presence of a complexing agent containing Fe(II), Fe(III), Al(III), chloride or combination thereof, wherein the complexing agent is at least slightly water soluble, whereby a lead product is formed which is less soluble than the lead originally in said material or waste, thereby reducing the leaching of lead from said material or waste as determined by a leach test performed on said material or waste.

2. The method of claim 1 wherein said water soluble phosphate comprises a phosphate selected from the group consisting of phosphoric acids, salts of phosphoric acids, $P_2O_5$, phosphate rock and combinations thereof.

3. The method of claim 2 wherein said salts of phosphoric acids include monoammonium phosphate, diammonium phosphate, disodium hydrogen phosphate, trisodium phosphate and combinations thereof.

4. The method of claim 1 wherein the complexing agent contains a multivalent metal cation component selected from the group consisting of $Fe(NO_3)_3$, $FeSO_4$, $Fe_2(SO_4)_3$, $FeCl_3$ and combinations thereof.

5. The method of claim 1 wherein the complexing agent contains a multivalent metal cation component selected from the group consisting of $Al_2(SO_4)_3$, $Al_2O_3$, aluminosilicate and combinations thereof.

6. The method of claim 1 wherein the phosphate and acid are added to the source of the lead bearing material or waste prior to generating said lead bearing material or waste.

7. The method of claim 1 wherein the lead bearing material or waste is contained in a waste stream.

8. The method of claim 3 wherein the phosphate and acid are contacted with waste stream equipment prior to or during the generation of lead bearing material or waste.

9. The method of claim 1 wherein the lead bearing material or waste is contained in a waste pile.

10. The method of claim 9 wherein the lead bearing material or waste and the phosphate and acid are mixed by tilling.

11. The method of claim 1 further comprising the step of contacting water with the lead bearing material or waste during or after contacting the phosphate and acid with said material or waste.

12. The method of claim 1 wherein waste phosphoric acid solution resulting from the chemical polishing or finishing of aluminum is used as the source of phosphate and acid.

13. A method for reducing the leaching of lead from a lead bearing material or waste, comprising contacting said material or waste with a composition comprising a water soluble phosphate and acid selected from the group consisting of sulfuric acid, nitric acid and combinations thereof, in the presence of aluminum and/or iron multivalent cationic component, whereby a lead product is formed which is less soluble than the lead originally in said material or waste, thereby reducing the leaching of lead from said material or waste as determined by a leach test performed on said material or waste.

14. The method of claim 13 wherein said water soluble phosphate comprises a phosphate selected from the group consisting of phosphoric acids, salts of phosphoric acids, $P_2O_5$, phosphate rock and combinations thereof.

15. The method of claim 13 wherein the water soluble phosphate is phosphoric acid.

16. The method of claim 14 wherein said salts of phosphoric acids include monoammonium phosphate, diammonium phosphate, disodium hydrogen phosphate, trisodium phosphate and combinations thereof.

17. The method of claim 13 wherein the composition is added to the source of the lead bearing material or waste prior to generating said lead bearing material or waste.

18. The method of claim 13 wherein the lead bearing material or waste is contained in a waste stream.

19. The method of claim 14 wherein the composition is contacted with waste stream equipment prior to or during the generation of lead bearing material or waste.

20. The method of claim 13 wherein the composition is a waste phosphoric acid solution comprising a source of phosphate and acid resulting from the chemical polishing or finishing of aluminum.

21. The method of claim 13 wherein the iron is derived from a water soluble iron source.

22. The method of claim 21 wherein the water soluble iron source is ferric sulfate.

23. A method for reducing the leaching of lead from lead bearing incinerator ash, comprising contacting said incinerator ash with a water soluble phosphate and acid selected from the group consisting of sulfuric acid, nitric acid and combinations thereof, in the presence of a complexing agent containing Fe(II), Fe(III), Al(III), chloride or combination thereof, wherein the completing agent is at least slightly water soluble, whereby a lead product is formed which is less soluble than the lead originally in said incinerator ash, thereby reducing the leaching of lead from said incinerator ash as determined by a leach test performed on said incinerator ash.

24. The method of claim 23 wherein the water soluble phosphate is phosphoric acid and the acid is sulfuric acid.

* * * * *